S. ROGERS.
CLIP FOR SWINGLETREES.
APPLICATION FILED APR. 24, 1908.
No. 917,899.
Patented Apr. 13, 1909.
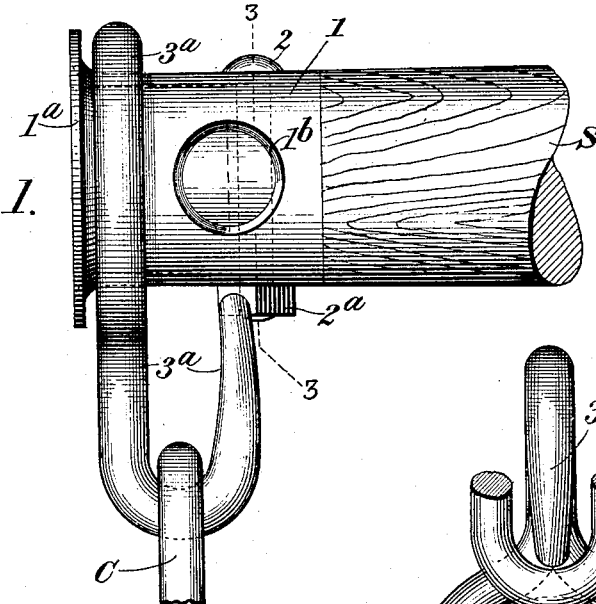
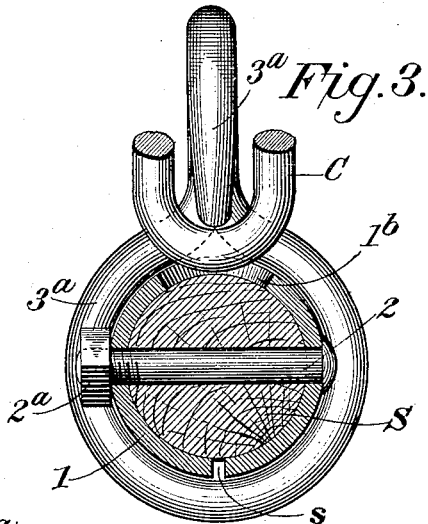
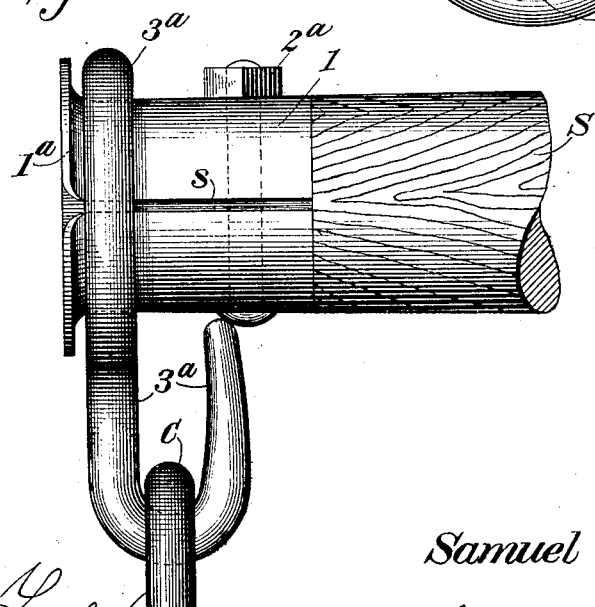
Inventor:
Samuel Rogers

UNITED STATES PATENT OFFICE.

SAMUEL ROGERS, OF FORT PAYNE, ALABAMA.

CLIP FOR SWINGLETREES.

No. 917,899.　　　Specification of Letters Patent.　　　Patented April 13, 1909.

Application filed April 24, 1908. Serial No. 428,901.

*To all whom it may concern:*

Be it known that I, SAMUEL ROGERS, of Fort Payne, in the county of Dekalb and State of Alabama, have invented certain new and useful Improvements in Clips for Swingletrees; and I hereby declare that the following is a full, clear, and exact description thereof, reference being had to the accompanying drawings, which form part of this specification.

This invention is an improved clip for swingle-trees, and consists essentially in a sheet metal clip or collar adapted to be fastened to the end of a swingle-tree to retain the ring-trace engaging hook thereon; and which clip is flanged at its outer end to prevent the hook from slipping off, and is split longitudinally and secured to the swingle-tree by a through-bolt, which bolt fastens the clip to the wood, prevents the hook from slipping off the clip toward the middle of the swingle-tree, and is used to cramp or tighten the clip on the tree in case of shrinkage of the wood. The longitudinal slit or split in the clip is purposely made therein to enable it to be fitted closely to the swingle-tree, and to be cramped thereupon as the wood shrinks. The clip is moreover provided with a recess in its top and the hook is so constructed relatively to the clip and recess that the trace chain can only be engaged or disengaged from the hook when the latter is raised to such position that its point is directly over the recess in the clip.

The invention will be more clearly understood from the following description thereof in connection with the accompanying drawings, in which—

Figure 1 is a top plan view of the clip as attached to the end of a swingle-tree. Fig. 2 is a bottom plan view of Fig. 1. Fig. 3 is a section on line 3—3, Fig. 1, showing a hook raised to position for engagement or disengagement of the trace chain.

The swingle-tree S may be of any desired construction and is customarily made of wood. To its ends are attached the clips 1 which, as constructed in accordance with my invention, are preferably made of a stout sheet metal strip bent into nearly cylindric form, but leaving a slit $s$ on the under side so that the clip can be readily fitted to swingle-trees of slightly different diameters, and so that in case of shrinkage the clip may be securely clamped upon the swingle-tree by tightening up nut $2^a$ on the securing bolt 2 which transfixes the swingle-tree and clip at right angles to the slot, as shown. The clip furthermore has an upturned flange $1^a$ on its outer edge which effectively prevents the hook-ring $3^a$ from slipping upwardly off the clip, the hook-ring being placed on the clip before the latter is placed on the swingle-tree. The clip moreover has a recess $1^b$ in its upper side, preferably opposite the slit S, for a purpose hereinafter explained. The hook-ring $3^a$ is kept from sliding inward on the swingle-tree by means of the bolt 2 and nut $2^a$, but has a limited lateral play between said bolt and the flange $1^a$; and it is free to swing around the clip. The point of the hook 3 is bent backward until it almost touches the clip, so that in the position shown in Figs. 1 and 2, and when the hook is in a horizontal position and below or out of line with the recess $1^b$, the trace-chain C cannot be disengaged from the hook as there is not room for the ring to pass between the point of the hook and the clip. But by turning the hook to vertical position, as indicated in Fig. 3, so that its point is directly opposite the recess $1^b$, the trace-chain C can then be slipped between the point of the hook and the recess $1^b$. In this position of the hook the trace-chain can be either engaged or disengaged therefrom; but in any other position of the hook the trace-chain cannot be engaged or disengaged therefrom.

From the foregoing it will be seen by reason of the slot S and the bolt 2 I am able to contract the clip and compensate for any shrinkage of the swingle-tree, and thus I can always fasten the clip rigidly to the swingle-tree, which is quite important. Further the flange and the bolt always retain the hook-ring upon the clip, so that the trace-chain cannot be engaged or disengaged from the hook until the point of the hook is turned to a position directly opposite the recess or slot $1^b$. Thus a simple, efficient and very durable trace-chain retaining clip is provided.

Having described my invention what I claim as new and desire to secure by Letters Patent is:

1. In combination, a sheet metal clip comprising a sleeve having an outwardly projecting flange on one end, and a longitudinal slit extending through the sleeve and flange and a recess in the side of the sleeve; with a hook-ring on the clip, and a hook on the ring having its free end bent toward the sleeve so that the trace ring cannot be engaged with or disengaged from the hook except when the point of the latter is opposite the said recess.

2. In combination with a swingle-tree, a split metal cuff provided with a flaring flange on its outer end adapted to retain the hook on the tree, and having a recess in one side remote from the split; with a hook having a ring loosely fitted on the cuff, the end of said hook extending inward toward the band sufficiently to prevent engagement or disengagement of the trace ring, except when the end of the hook is brought opposite the said recess in the band, and a bolt transfixing the clip at the inner side of the recess and both securing the clip to the swingle-tree and also retaining the hook ring on the clip.

In testimony that I claim the foregoing as my own, I affix my signature in presence of two witnesses.

SAMUEL ROGERS.

Witnesses:
G. E. UTIN,
W. B. GARVIN.